United States Patent [19]

Tessera

[11] 3,969,702

[45] July 13, 1976

[54] ELECTRONIC COMPUTER WITH INDEPENDENT FUNCTIONAL NETWORKS FOR SIMULTANEOUSLY CARRYING OUT DIFFERENT OPERATIONS ON THE SAME DATA

[75] Inventor: Giancarlo Tessera, Milan, Italy

[73] Assignee: Honeywell Information Systems, Inc., Waltham, Mass.

[22] Filed: July 2, 1974

[21] Appl. No.: 485,468

[30] Foreign Application Priority Data
July 10, 1973   Italy .................................. 26397/73

[52] U.S. Cl. .......................................... 340/172.5
[51] Int. Cl.² ....................... G06F 9/08; G06F 9/20; G06F 13/00
[58] Field of Search ................................ 340/172.5

[56] References Cited
UNITED STATES PATENTS

| | | |
|---|---|---|
| 3,287,702 | 11/1966 | Borck, Jr. et al. ............... 340/172.5 |
| 3,308,436 | 3/1967 | Borck, Jr. et al. ............... 340/172.5 |
| 3,364,472 | 1/1968 | Sloper ............................. 340/172.5 |
| 3,470,540 | 9/1969 | Levy ................................ 340/172.5 |
| 3,537,074 | 10/1970 | Stokes et al. .................... 340/172.5 |
| 3,544,973 | 12/1970 | Borck, Jr. et al. ............... 340/172.5 |
| 3,787,673 | 1/1974 | Watson et al. ................... 340/172.5 |
| 3,815,095 | 6/1974 | Wester ............................. 340/172.5 |

*Primary Examiner*—Gareth D. Shaw
*Assistant Examiner*—Michael C. Sachs
*Attorney, Agent, or Firm*—Faith F. Driscoll; Ronald T. Reiling; Nicholas Prasinos

[57] ABSTRACT

A data processing system includes a control unit, working store and an operating section for performing operations upon information fetched from the working store. The operating section includes a plurality of independent, functionally different units. The control unit during the fetching and execution of program instructions enables a number of the units to perform different operations simultaneously upon the same information thereby increasing the overall speed of processing program instructions.

16 Claims, 3 Drawing Figures

ELECTRONIC COMPUTER WITH INDEPENDENT FUNCTIONAL NETWORKS FOR SIMULTANEOUSLY CARRYING OUT DIFFERENT OPERATIONS ON THE SAME DATA

BACKGROUND OF THE INVENTION

1. Field of Use

The present invention relates to an electronic computer provided with independent functional networks or units for simultaneously executing different operations on the same data.

2. Prior Art

It is known that from a logical-functional point of view, electronic computers are made up of functional networks or units which have specific functions.

The functional units which can be identified in the simplest form of the computer are:

a working storage, a block of working registers, a logic-arithmetic unit, and a control unit.

These functional units are connected to each other by means of a data transfer network and by means of a network which is specially designed for the purpose of transmitting commands and which links the control unit to the various functional units indicated above. Additionally, peripheral devices such as printers, card readers/card punchers or strip perforators are generally provided as well. These devices are connected to the computer (particularly to some functional units) under the control of the above named control unit or of an additional specialized control unit.

It is also known that the execution of predetermined operations with suitable data, e.g., operation of arithmetical addition, usually involves the necessity of carrying out a plurality of operations which may be defined as elementary and which require the repeated and successive use of the available resources that is, the various functional units.

For example, the arithmetic operation of adding two data units is carried out by means of a program instruction which specifies the operation to be performed, the address of the storage location which contains the first operand, the length of the operand expressed as the number of storage locations to be addressed, the address of the second operand and the length of the second operand. The execution of the operation which has been specified is preceded by a preparatory or fetching phase in which all this information is loaded into the appropriate working registers and from there controls the actual phase of executing the operation.

The subsequent execution phase, generally, involves the repeated execution of the requested operation with one portion of the data and with each operative step the updating of the information which controls it. Updating means, for example, the increase or decrease of the addresses and of the lengths of the operands.

If the operating unit intended for this function is the logic-arithmetic unit, it is clear that this unit must, successively, operate on the addresses, the lengths, and the actual operand data themselves. This causes a considerable decrease in the speed of operation of the computer. The disadvantage has generally been eliminated by adding to the logical-arithmetical unit other independent functional units, particularly specialized counting networks specifically used for carrying out the updating of the addresses and of the operand lengths.

Consequently, it can be said that a multiplexing of functional networks of the same type has been employed, however for carrying out the same type of operation on different data. In complex computers of considerable capacity, this concept has been extended in order to attain the capability of being able to run more programs concurrently.

Provision has then been made for dividing some functional units into simpler units which can be operated in parallel or alternatively, by effective multiplexing, thereby have made possible the simultaneous execution of more operations of the same type but always on different data fetched by different programs.

SUMMARY OF THE PRESENT INVENTION

With respect to the above examples of the state of the art, the invention is characterized by the feature of separating some functional units into independent, distinct functional units to permit different operations to be performed on the same data at the same time. This is of particular advantage because in addition to a predetermined operation, in many cases, it is necessary to perform other operations such as checks and comparisons on given units of data, or otherwise, these operations would have to be performed in a subsequent phase, impairing the performace of the computer.

These and other characteristics and the advantages of the present invention will become clearer from the following description when considered in connection with the attached drawings which illustrate a preferred embodiment of the present invention.

BRIEF DESCRIPTION OF THE PREFERRED EMBODIMENT

FIG. 1 schematically represents a block diagram of the control unit of the computer.

FIG. 2 schematically represents a block diagram of the operative section of the computer which includes a plurality of functional independent units according to the present invention.

FIG. 3 schematically represents a block diagram of the storage unit of the computer.

DESCRIPTION OF THE PREFERRED EMBODIMENT

Figure 1:
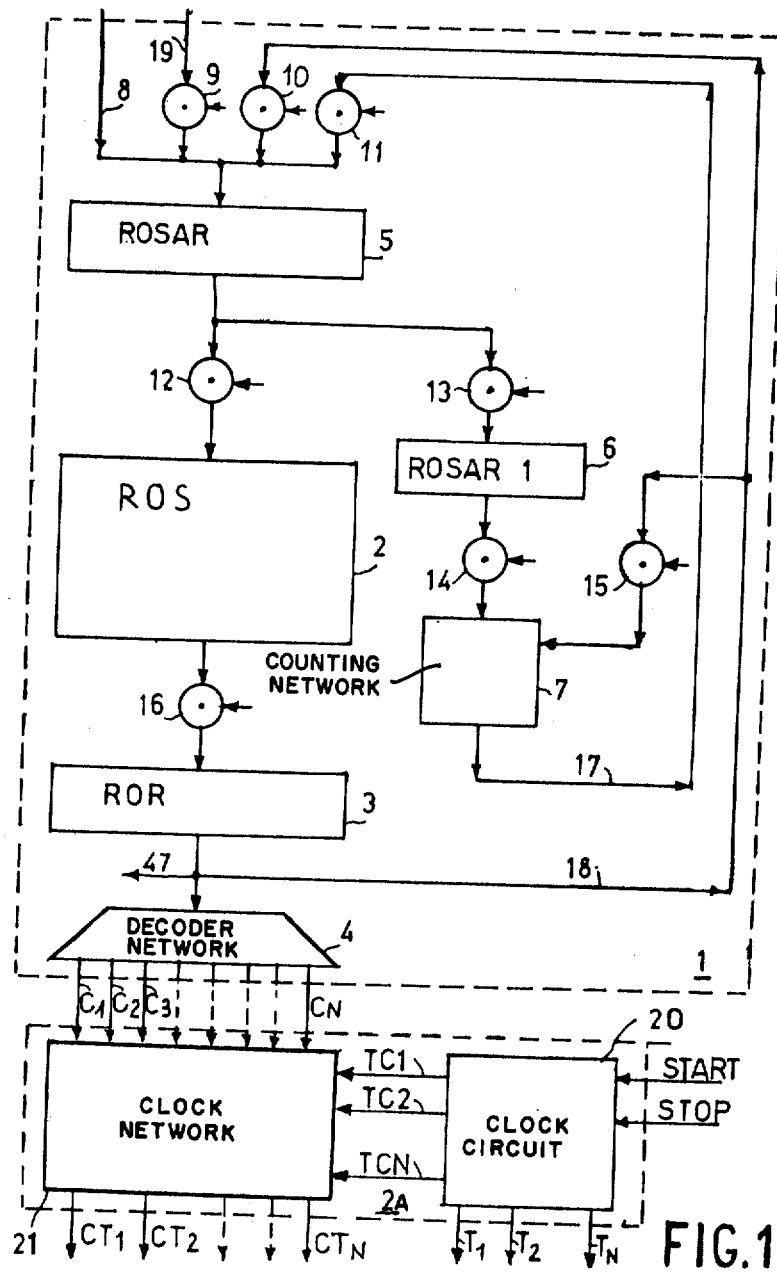
Figure 2:
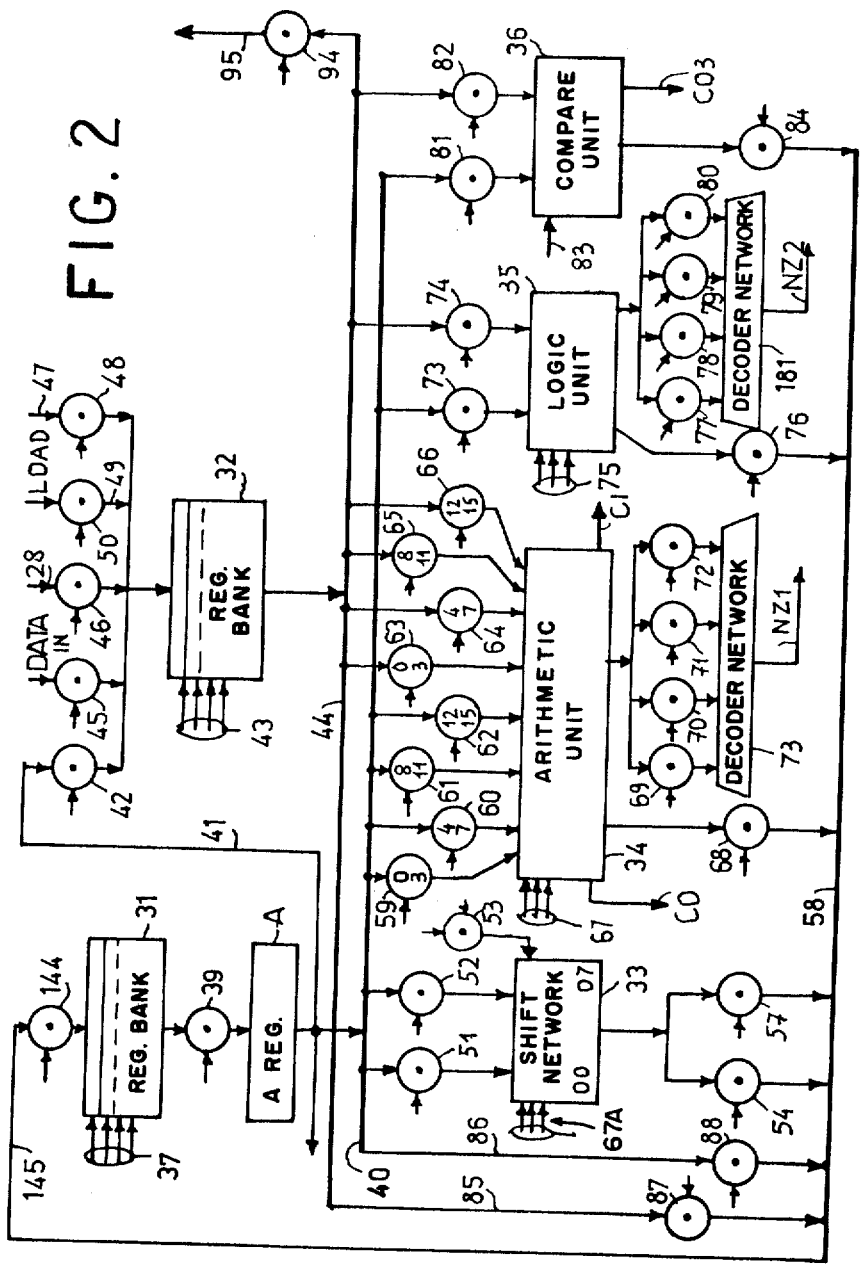
Figure 3:
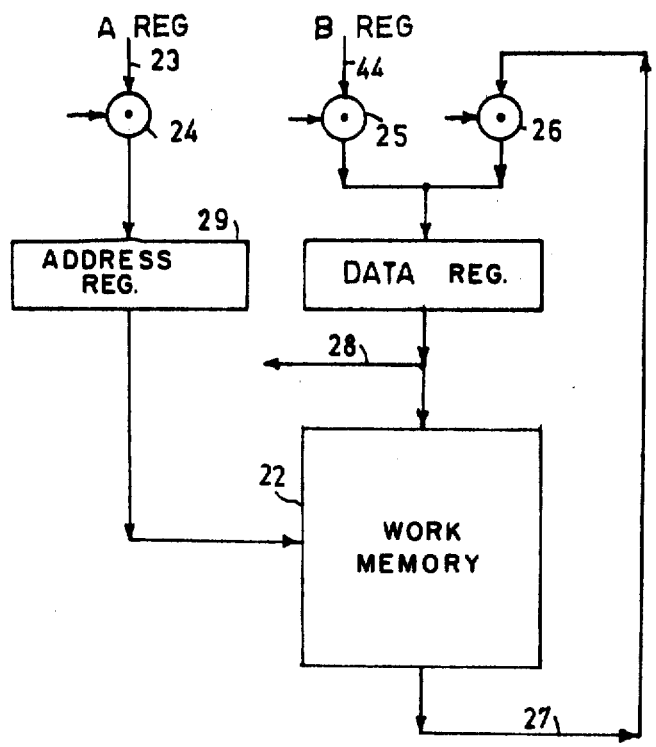

Together, FIGS. 1, 2 and 3 represent the general structure of a computer embodying the present invention. For the sake of simplicity of representation and clarity of description, only the essential parts are shown herein. For example, the entire network for distributing the microcommands has not been shown, it being understood that the microcommands generated by the control unit will enable definite groups of AND gates to transfer electrical signals. Also, the network for the distribution of information is shown only in part.

The interconnections between the various figures are indicated by letter designations to which reference is made in the description which follows.

In this way it is possible to provide a simple description of the essential details eliminating all non-essential references and the details of implementation which are within those skilled in the art. This permits the more important aspects of the invention to be stressed and provides the person skilled in the art, particularly the person skilled in the design of computers with all the elements required for carrying out the invention.

FIG. 1 shows the control unit 1 and the clock or timer unit 2A of the computer. For the sake of clarity of explanation, it is appropriate to consider first of all the clock unit 2A. This unit is substantially composed of a clock circuit 20 and a clock network 21. The clock circuit may suitably consist of a delay line with intermediate taps which is driven by a one shot circuit controlled either by an external START signal or by a signal from the end of the delay line itself, so as to produce a cyclic sequence of clock pulses. Alternatively, the clock circuit can use a high-frequency oscilating circuit to produce a base frequency from which a sequence of clock pulses can be obtained by means of frequency-dividing networks.

Such circuits may take the form of timing circuits disclosed in U.S. Pat. No. 3,201,762 to H. W. Schrimpf which issued Aug. 17, 1965 and is assigned to the same assignee as named herein. Also, such circuits may be found in the publication "The Integrated Circuits Catalogue for Design Engineers" published by Texas Instruments Inc. dated 1972.

The operation of the clock circuit can be stopped at the end of each timing cycle by means of a stop comand signal applied to a STOP input terminal. Some of the clock pulses are transferred through output terminals $T_1$, $T_2$, $T_3$, and $T_N$ directly to various points of the computer where they cyclically control the enabling of predetermined AND gate circuits. Other clock pulses TC1, TC2 through TCN are, on the contrary, applied to a clock network 21 which forms part of the timing unit 2. A decoder may take the form of the decoders disclosed in the text published by Texas Instruments Inc. as well as the cited U.S. Pat. No. 3,201,762. Moreover, they may take the form of the circuits disclosed in various technical bulletins published by Texas Instruments, Inc. For example, the bulletin in DL-S-7211844 dated December, 1972 discloses a 4-line to 16-line decoder which decodes a 4-bit input code into 1 of 16 mutually exclusive outputs. Also, the decoder is provided with a clocking input so as to operate in the manner disclosed in the instant specification. From the control unit, the clock network receives a number of signals or microcommands C1, C2, C3 through CN via a number of AND-gate circuits and if necessary via storage elements and generates a number of microcommands CT1, ... CN which are appropriately timed and of a suitable duration. By means of a special command network, not shown, these microcommands are distributed to suitable points of the computer, including the control unit itself, the operating section, and the storage unit. In FIGS. 1, 2, and 3, an arrow pointing to a control element, generally represented by a circle, will, unless otherwise specified, indicate that to the lead represented by the arrow will be applied either a suitable timing singal T1 ... Tn or a suitable, timed microcommand CT1 ... CTN.

The control unit 1 is the microprogramming type and substantially comprises a single read only storage or ROS 2, an output register for this storage designated ROR (Read Only Register) and also marked 3, a decoder network 4, a ROS address register LABELED ROSAR (Read only Storage Address Register) and numbered 5, an auxiliary register for storing the addresses of ROS and ROSAR 1 designated 6, and a counting network 7 for incrementing the addresses.

The ROS store contains microwords, each for example, 20 bits arranged in the form of microprograms which control the operation of the computer and which are fetched as required in response to program instructions. The circles 9, 10, 11, 12 through 16 represent sets of groups of AND-gate circuits which control the transfer of signals along the transfer paths associated therewith. As mentioned previously, each group 9 through 16 is controlled either by a clock pulse Ti or by a timed microcommand CTi. In particular, the sets of gates 12, 13, and 16 are controlled by clock pulses, while the sets of gates 9, 10, 11, 14 and 15 are controlled by timed microcommands. Each group receives as input and when enabled transmits as output a number of suitable signals over a group of wires, represented by a single line and hereinafter termed "channels".

Over channel 8 which is not conditioned by any AND-gate circuit can be sent out a complex of signals representing a predetermined binary coded address in ROS. This address can be obtained by means of forcing the initialization of the computer, e.g., by means of presetting suitable keys or switches on a control console, and the generation of a computer start pulse which controls the start of the clock unit through the START lead.

The address present in channel 8 is then loaded into the ROSAR register and as soon as the set of AND gates 12 is activated (by a clock pulse), the ROS storage is addressed and a microword is read out. After transfer through the set of gates 16, this microword is loaded into register ROS 3. This same microword, now present at the outputs of register ROS 3, is decoded in decoder network 4, and the decoded signals are transferred to the clock network from which they emerge in the form of timed microcommands.

The address from ROS contained in register 5 can be modified in the following ways. It can be loaded into register ROSAR 1 through the set of gates 13. From there, via the group of gates 14 when enabled, it is applied to the counting network 7 where it is, e.g., incremented by one unit. The modified address is then reloaded into register 5 through channel 17 and the group of AND gates 11. As an alternative, the address can be increased by a suitable amount K, derived from the microword present in register ROR 3 and applied to the counting network 7 through channel 18 and the group of gates 15. As yet, another alternative, the new address of ROS can be derived from the microword extracted from ROS and stored in register ROR. That is, a certain number of bits can be transferred to register ROSAR 5 through channel 18 and the group of gates 10.

A further address modification is achieved through channel 19, controlled by the group of gates 9, which permits register 5 to be loaded with the content of a register A, one of the several registers belonging to the operating section of the computer illustrated in FIG. 2. Since the content of such a register A may have originated, as discussed herein, either from other registers of the operating section, from peripheral or external units, or from the storage unit, it follows that in general terms the addressing of ROS can be effected by utilizing any sources of information within the computer and connected to it.

The parallelism of the control unit which has been described is worth a brief explanation. The length of the addresses of ROS, expressed in bits, depends upon the number of ROS storage locations which must be addressed and is independent of the length of the microwords read out from ROS. For example, the addresses of ROS can have a length of 16 bits which permits about 64,000 different storage locations to be addressed. This means that all the channels used to load the address of ROS will include 16 wires and that registers 5 and 6 will have 16 bit positions. On the other hand, register 3 will have as many individual bit positions as there are bits making up a microword, e.g., 20. This also means that when the address of ROS is derived from a microword contained in ROR only 16 of the 20 bits are used as address and transferred over channel 18.

FIG. 3 schematically represents a block diagram of the storage unit of the computer. The storage unit essentially comprises a work memory 22, e.g., a magnetic core memory of 2 "bytes" in width, an addressing register 29, a data register "DATA", and a certain number of communication channels. Addressing register 29 receives coded information contained in a register A from channel 23 and through AND-gate group 24. For this reason, the input to the group of gates 24 has been marked A REG. Register A forms part of the registers of the operating section illustrated in FIG. 2.

Register 29 is of a length corresponding to the maximum desired storage capacity. For example, a 16 bit register permits 64,000 storage locations to be addressed and is compatible with the parallelism of the computer as described. The data to be written into the memory is transferred to the storage through the channel 44 controlled by the group of gates 25 and is transferred from a register B (indicated by the input to the group of gates 25 being marked B REG) to the DATA register, and from there to storage. The B register is one of the registers of the operating section illustrated in FIG. 2.

The data read out from storage is sent over channel 27, loaded into the "DATA" register through the group of gates 26, and are from there applied to the register B, mentioned above, through channel 28.

While the control unit acts directly on the storage unit through control of the gates 24, 25, and 26, the exchange of information takes place exclusively between the operating section of the computer and the storage unit.

The operating section of the computer is shown in FIG. 2 and comprises substantially two register banks 31 and 32, a working (output) register A, and a number of operative networks 33, 34, 35 and 36 which are structurally distinct and functionally independent.

Operative networks are well known in the art and they also take the form of integrated circuits disclosed in the text published by Texas Instruments Inc. Additionally, the arithmetic-logic unit could take the form of the circuits disclosed in Bulletin DL-S-7211831 dated December, 1972. The units perform arithmetic operations such as addition, subtraction and logical operations, such as exclusive OR, AND, OR, NAND OR NOR on two 4-bit operand words. Also, different ones of the functional units may also be found in Bulletin DL-S-7211832 which discloses a 4-bit binary full adder, in Bulletin DL-S-7211741 which discloses a 4-bit parallel binary multiplier, in Bulletin DL-S-7211866 which discloses a 4-bit bidirectional shift register circuit and in Bulletin DL-S-7211841 which discloses an 8-bit bidirectional shift register. Register bank 31 has 16 registers, each storing 16 bits, and which are addressed by a code of microcommands applied the inputs 37. As a consequence of this type of joint addressing and control of the group of gates 144 at the input to the register bank, or gates 39 at the output to the register bank, it is possible to store in the addressed register an item of information coming from channel 145 and, alternatively or together, store the information contained in or loaded into the addressed register in the output register A.

The content of register A is in turn applied to distributor channel 40 and through gate circuits selectively to one or more operating networks. The content of register A can also be sent to register bank 32 through channel 41 and the gate circuits 42.

Register bank 32 may also comprise 16 registers, each of 16 bits, and addressed by code of microcommands applied inputs 43. The content of the addressed register is always present in distributor channel 44 and from there can be selectively applied to one or more operating networks through gate circuits.

The register of register bank 32 which is being addressed may in its turn be loaded with information originating from the following sources. It has already been seen that the data contained in A can be transferred to bank 32 through channel 41 and the group of gates 42. Other sources are a channel for data originating from peripheral devices external the computer. A channel of this type is identified by DATA IN and controlled by the group of gates 45. The data coming from the main storage over channel 28 (FIG. 3) is transferred to register bank 32 through the group of gates 46 for processing by the same operating section.

The microprogrammed read only storage ROS can also send to bank 32 data for storage therein. For this reason, a channel 47 is provided which connects the output of register ROR (FIG. 1) with register bank 32. This channel is controlled by the group of gates 48.

It is also possible to force predetermined information into register bank 32 through a channel 49 (LOAD) which is controlled by the group of gates 50. Channel 49 can receive information generated by means of console keys selected by an operator.

The two register banks 31 and 32 can be controlled in parallel, so as to address in either of them, one and only predetermined register at one time. In the case of bank 31, this is illustrated by the presence of register A. It is also the time for bank 32 which due to the effects of the operating structure of the computer is seen at any time as single register B. Registers A and B provide the necessary and simultaneous physical storage for two items of data which are transferred to the operating networks for processing. The several operating networks are connected to registers A and B by means of two distributor channels 40 and 44 and by means of a certain number of gate circuits.

According to the format of the data to be processed (binary-decimal, "packed" or "unpacked"), the type of operation to be carried out, and the degree of parallelism of the registers and of the operating networks, it is convenient to have a suitable arrangement of the gate circuits in groups or sets. In the scheme which has been represented, unit 33 through inputs 67A is provided for carrying out operations of translation or shift to the right or to the left of one or more bits in response to the microcommands received from the control unit.

Unit 33, for example, may accommodate 8 bits in parallel, indicated by the designations 00–07 contained inside the block representing this unit and connects to the distribution channel 40. As this channel has a parallelism of 16 bits in the example given, two independent AND groups 51 and 52 have been provided in order to apply selectively in a mutually exclusive way a first or second "byte" present on distributor channel 40 to the shift network.

Similarly, the outputs of the shift network 33 are, through two groups of gates 54 and 57, connected to a collector channel 58 which has been provided with a parallelism of 16 bits.

When the group of gates 54 is activated, the outputs of the shift network corresponding to a first byte are connected to a first group of 8 wires of channel 58. A group of gates 53 at the input of the shift network 33 also allows to force into output positions of the shift network from where data has been removed, bits having a predetermined value of 1 or 0.

The shift network 33 may be constructed using conventional electrical logical circuits and preferably using integrated-circuit technology, leading to an assembly composed of a reduced number of readily available components or packages. Sufficient circuit information on this subject can be found in the catalogs of the manufacturers of integrated circuits as well as in the copious literature available in the field of electronic computers. For example, reference may be made to the text by Robert S. Ledley titled "Digital Computer and Control Engineering" published by McGraw-Hill Book Company, Inc., Part 4, Copyright 1960.

Block 34 is a binary and decimal arithmetic unit for performing additions and subtractions. The parallelism provided for this unit can be, e.g., 16 bits (2 bytes). Arithmetic unit 34 is connected either to distributor channel 44 or to distributor channel 40 so as to receive data simultaneously both from register A and from register bank 32 (i.e. from a logical point of view from register B).

The connections to the distributor channels are controlled by various groups of gates 59, 60, 61, 62, 63, 64, 65 and 66, each group controlling four wires, corresponding to four bits.

For each group of gates the order of the wires controlled has been indicated in the Figure, by labeling the numbers of the bits.

Arithmetic unit 34 is capable of adding or subtracting in the binary or decimal form ("packed" or "unpacked") the content of register A to (from) the content of register B, and also of altering the content of register A by a fixed amount, e.g., ±1, ±2. Arithmetic unit 34 is also controlled by a certain number of microcommands applied to inputs 67.

The outputs of the arithmetic unit are connected to collector channel 58 through a group of gates 68. The outputs of the arithmetic unit also connect over further groups of gates 69, 70, 71 and 72 to a decoder network 73 which detects an output bit pattern of the arithmetic unit consisting of all ZEROS or to all ONES, limited to those groups of bits applied by the corresponding ones of the gates 69, 70, 71 and 72. The signal NZ1 generated by the decoder network represents a signal of "condition verified" which is used as required in order to subject the operations carried out by the arithmetic unit 34 to suitable tests. Other signals which are used to perform tests or for modifying successive operations are generated by the arithmetic unit and constitute the carries for the operations, designated "Carry Out" CO and "Carry In" CI.

Block 35 is a logical unit for carrying out logical operations such as OR, AND, OR EXCLUSIVE of the two operands. The parallelism of such a unit may be, e.g., of 16 bits (2 bytes). The logic unit 35 is connected either to distributor channel 44 or to distributor channel 40 via two groups of gates 73 and 74. Logical unit 35 is likewise controlled by a certain number of microcommands applied to inputs 75.

The outputs of the logic unit are connected to the collector channel 58 through the group of gates 76. The outputs of the logic unit are connected through further groups of gates 77, 78, 79 and 80 to a decoder network 181 which detects an output bit pattern from the logic unit of all ZEROS or all ONES, limited to those groups of bits applied by corresponding ones of the gates 77 through 80.

The signal NZ2 generated from the decoder network 181 represents a signal of condition verified which is used as required in order to subject the operations carried out by the logic unit to suitable tests.

Block 36 is a logic unit for carrying out a logical comparison operation, effected, e.g., by means of binary subtraction of the content of register B from the content of register A. The parallelism for such a unit may be, e.g., 16 bits.

Comparison unit 36 is connected to the distributor channels 40 and 44 via the two groups of gates 81 and 82 respectively and is controlled by a suitable microcommand applied to input 83. The outputs of the comparison unit are connected to the collector channel 58 through the group of gates 84. The comparison unit 36 is also provided with a carry output of the comparison operation (CO3) which is used as required in order to subject the operations effected by the comparison unit to suitable tests.

The above mentioned operating units 34, 35, and 36 have not been described in greater detail herein since sufficient information describing such logic circuits can be found in the exhaustive literature which is available, and in the aforementioned text.

For the purpose of completing the description of the operating section, it should be pointed out that collector channel 58 is linked to channel 145. Therefore, the data present in the collector channel, resulting from operations carried out by one of the operating units, can be transferred to and stored in a suitable register of bank 31. From there, it may be transferred to register A, then to bank 32 for eventual storage in the main memory, or transferred to an external peripheral device through channel 44, the group of gates 94, and channel 95. There are also provided two "by-pass" channels 35 and 36 controlled by groups of gates 87 and 88 in order to connect the two distributor channels 40 and 44 directly to collector channel 58.

In addition, a certain number of flip-flops have been provided for the purpose of storing special conditions such as previous carries (carry in and carry out) and results of tests effected by means of specialized decoder networks.

DESCRIPTION OF OPERATION

The existence of physically distinct and logically independent operating units represents the key feature of the present invention and permits two distinct operations to be carried out on the same data at the same time. The following examples will clearly illustrate the advantages and capabilities offered by this type of system. For a thorough understanding of the operation of the system it is, however, suitable first to give a concise description of the way in which the control unit, the storage unit, and the operating section cooperate in executing one microinstruction. For the sake of simplicity, it will be assumed that the program to be executed and the pertinent data are contained in the main storage. By means of console keys, it is possible to force with an initializing command the address of the first character of the first program instruction, generally a function (op code) code, into a convenient register of bank 32. This is accomplished via the LOAD channel and through gates 50. At the same time, it is possible with the same initializing command to force a suitable microprogram address into the register ROSAR (FIG. 1, block numbered 5).

The microprogram which was initiated is an a-phase microprogram which governs the fetching from storage of all the items of information required for carrying out one instruction. Through consecutive machine cycles, the control unit 1 proceeds to generate microcommands and to update the microprogram address by means of counting network 7 (FIG. 1). At the same time, the program address contained in B is sent to register 51 for addressing the storage (FIG. 3) and passes through bank 31. At the same time, the address is incremented by one unit through the arithmetic unit 34 and is transferred into a special register of bank 31 which is called "instruction register" because of its specific function.

The information read out from the memory is transferred from the DATA register (FIG. 3) into a register of bank 32 and is from there transferred into a register of bank 31. The new address contained in the instruction register is used in a subsequent cycle in order to address again the storage and is concurrently updated by the arithmetic unit 34 and again stored in the instruction register of bank 31. The new piece of information read from storage is transferred from the DATA register into a register of bank 32 and from there is transferred into a register of bank 31.

The repetition of these operations under the control of the control unit causes to be loaded into register bank 31, an entire program instruction constituting several characters and generally comprising a function code, one or two operand addresses and their lengths, as well as items of information eventually required for executing the instruction or for verifying particular conditions. If convenient or necessary, some of the items of information or portions of the instruction may, of course, be loaded into register bank 32 as well.

This preparatory or "fetching" phase of the computer operation is effected under the control of a microprogram which is called the α-phase. At the end of this microprogram, a microprogram for executing the instruction called a beta microprogram is begun. If it does not directly follow the address of the last α-phase microinstruction, the address of this microprogram can, for example, be obtained from the last α-phase microinstruction, by referencing the items of information contained in the banks of registers 31 and 32.

The function code of the instruction which was read out may itself, for example, contain an address for referencing a β-phase microinstruction or else a parameter which upon after suitable treatment during the α-phase furnishes the first address of the execution microprogram. The execution microprogram actually provides for the performing of the operations requested by the instruction with the specified data and at its conclusion returns control to the α-phase microprogram for interpretation of the subsequent instruction which will be located by the address contained in the instruction register. This brief description therefore explains the behavior of the microprogrammed computer described above.

The advantages derived from the existence of independent operating networks will now be considered. From the preceding description, it appears evident that an operation which is performed with the utmost frequency during either the preparatory phase or execution phase is that of reading out items of information from storage.

The reading of information from storage is controlled by addresses which as required fetch information of different types such as data on which operations are performed, instruction codes, other addresses, various parameters, etc. The different types of information are organized in the memory so as to form classes or groups which are homogeneous with respect to particular characteristics. This grouping of the information is called segmentation of the storage and is very useful, as it permits some tests to be performed during the operation of the computer, and allows those items of information which one does not wish to lose to be protected.

In each segment, that is, in each ordered sequence of storage addresses located between a "base address" and a "final address", are grouped all those items of information subject to particular common restrictions. For example, one of the simplest forms of segmentation consists of dividing the storage into one segment in which access is permitted only for read operations (excluding erasure and writing operations) and into a second segment in which both read, erasure and writing operations are admissible. In the first segment can be stored, for example, a supervisory program, fixed conversion tables, various parameters while user programs and data can be allocated to the second segment.

The "base address" of the second segment can vary from user to user and forms a parameter which can be modified under special conditions of usage which the supervisory program can store in one of the registers of bank 32.

While carrying out user programs and data processing, it is advisable to verify that the storage addresses through which the various items of information are referenced always specify access to the appropriate segment and that they are, e.g., all larger than or equal to the base address of the second segment. This check cannot be carried out by a fixed decoder network, because such an address forms a variable parameter. Therefore, it must rather be performed by an arithmetic or a comparison unit. From this, it follows that in a computer provided with a single operating unit, when addressing the storage, it is necessary first of all to check whether the address belongs to the appropriate segment, utilizing the operating unit for this purpose and, in a second step, increment the storage address, using the same operating unit.

In the computer according to the present invention, the presence of arithmetic unit 34 and comparison network 36 (FIG. 2) which are functionally independent allows these two operations to be carried out simultaneously thereby increasing the over-all speed of operation of the computer. With reference to FIGS. 2 and 3, during the execution cycle of one microinstruction, the storage address contained in register A is transferred to register SI for addressing the memory and at the same time is concurrently applied to the arithmetic unit 34 and to the comparison network 36 respectively via the groups of gates 59 and 60 and group 81. As a consequence of the microcommands applied to inputs 67, the arithmetic unit increments the storage address by one unit and loads it via the group of gates 68 and 144 into a convenient register of bank 31. At the same time, network 36 receives the base address of the second segment from register bank 32 and through the group of gates 82. The comparison network 36 performs the subtraction of the memory storage address and the base address. If the comparison is positive or zero, or if the memory storage address is larger than or equal to the base address, no carry appears at output CO3 of the network. If this is not the case, a carry signal appears on that output and this signal may be used as an interrupt signal for signaling the supervisory program that a violation of the protected segment is in progress.

What has been described is, of course, only one example of the possible forms of combined and simultaneous use of independent functional networks. Now, as a further example, the simultaneous use of the shift network 33 and of the logic network 35 will now be considered.

It is known that binary multiplication can be carried out by means of the combination of shift operations and addition operations. During the course of the shift operations, it is necessary to verify that the so-called "overflow" (that is, all the bits which are lost/shifted out) is ZERO. This check can be performed by operating the logic network in parallel to the shift network. Specifically, the data to be shifted is applied from register A selectively through groups of gates 51 and 52 to the shift register and is subjected to the shifting operation. The shifted information is transferred through the groups of gates 54, 57, and 144 to a suitable register of bank 31. Depending upon the length of the information in "bytes" and the number of bits to be shifted, the operation may be repeated several times in successive cycles.

At the same time, the data to be shifted is applied to the logic unit 35. To this unit is also applied, via a group of gates 74, a suitable mask (or else an appropriate binary code) taken from register bank 32, where it had been stored during any one of the preceding cycles of operation.

If, for example, the maximum shifting provided is one of N bits, the mask can be a succession of bits in which the most significant N bits are set to ONES and the remaining bits are ZEROS. This condition is checked by the decoder network 81 which may or may not generate the signal NZ2.

Another example of the possible combined and simultaneous use of two independent functional networks is the following. When decimal operations are to be carried out with data in an "unpacked" form, it is advisable to check that the data being operated upon is numerical data, and not for example, alphabetical-type data. It is known that numerical data in "unpacked" form is represented by one byte (8 bits) in which the first four bits called "zone" furnish the information that the byte is effectively representing a decimal number, and the remaining four bits supply the actual value of the number. If the operation to be performed is to increment or decrement by a fixed amount, the data contained in register A,, the number is transferred to the arithmetic unit through the group of gates 59 and 60. The incrementing is effected on the group of bits which define the value of the number and the new value is stored in a register of bank 31 via the usual path (gates 68, channel 58, and gates 144). At the same time, the number is applied to the logic unit 35 through the group of gates 73. From register B through the group of gates 74, the logic unit also receives a number whose zone had been previously checked. The logic unit carries out an exclusive-OR operation on the two numbers.

The resulting output will be zero if the two zones coincide. The decoder network 181 enabled only for the zone group of bits will give a signal NZ2 which indicates that the zone has the proper value.

If the operation to be performed is an addition or subtraction operation on two operands, the two numbers contained in register A and in register B respectively are transferred both to the arithmetic unit and to the logic unit. While the arithmetic unit performs the operation specified on the bits related to the value of the numbers, the logic unit performs the comparison (by an exclusive-OR operation) on the "zones" of the two numbers. If the correctness of one of the zones is known, the correctness of the other is checked. But even in case there is uncertainty with regard to the correctness of both zones, the probability of performing incorrect numerical operations on non-numerical data is greatly reduced since the probability that both zones define non-numerical data is extremely low particularly when performing operations on numerical data.

It is clear that the several methods of using functionally independent operating networks which have been illustrated above are only examples and that the features offered by the structure of the computer described can also be utilized in other ways which will occur to those skilled in the art. It is also clear that the computer described herein is given by way of example only and that there are modifications which can be made without departing from the scope of the invention.

What is claimed is:

1. An electronic computer for manipulating data comprising:
   a control unit;
   a working storage unit for storing information including data and program instructions;
   a first group of working registers;
   a second group of work registers;
   a logic-arithmetic unit comprising a plurality of different independent functional network units for performing different operations on said data, each having input and output terminals and each being coupled to said control unit;
   a first distributing channel circuit means for connecting said first group of work registers to the input terminals of each of said functional network units;
   a second distributing channel circuit means for connecting said second group of work registers to each of said functional network units;
   a collector channel circuit connecting the output terminals of each of said functional units to said first group of working registers;
   a plurality of decoding networks connected to the output terminals of at least a number of said functional units for signaling the results of certain ones of said different operations and
   a plurality of gate circuit means connecting said input terminals of each of said functional units to said first and second channel distribution circuit means, said gate circuit means being connected to be enabled selectively by said control unit for transferring simultaneously the same data from one of said working registers to at least a pair of said independent functional units conditioned by said control unit for performing different operations thereon during the processing of one of said program instructions, said pair including one of said number of units having its output terminals connected to a corresponding one of said decoding networks.

2. The computer of claim 1 wherein said plurality of functional independent units comprises an arithmetic network, a logic network and a shift network.

3. The computer of claim 2 wherein said plurality of independent functional units further comprises a comparison network.

4. A data processing system comprising:
control means;
working storage means for storing units of information representative of instructions and data for at least one program;
logic and arithmetic means coupled to said control means and to said storage means, said logic and arithmetic means including a plurality of independent functionally different processing network means, each being individually coupled to said control means and having input and output terminals;
distribution circuit means coupled to said working storage means for receiving said information;
a plurality of gating means coupled to said distribution circuit means and each coupled to the input terminals of a different predetermined one of said processing network means; and,
said control means being coupled to each of said gating means, said control means being operative to process one of said program instructions said control means in response to said one of said program instructions generating a series of subcommand signals for enabling at least a pair of said gating means to apply the same units of data simultaneously to corresponding ones of said processing network means and for causing each of said corresponding ones of said processing network means for performing different types of operations upon the same units of data.

5. The system according to claim 4 wherein said distribution circuit means includes first and second channel circuit means coupled to said plurality of gating means and wherein said system further includes;
a first group of working register means for storing units of information read from said storage means corresponding to a first operand required for the execution of said one of said instruction, said first group of working register means being coupled to said first channel circuit means;
a second group of working register means for storing units of information from said storage means corresponding to a second operand required for the execution of said one instruction, said second group of working register means being coupled to said second channel circuit means; and
said control means being coupled to said first and second groups of working register means, said control means being operative to condition selectively said first and second group of working register means to apply one of said units of information representative of one of said operands to said pair of gating means enabling said different types of operations to be performed simultaneously on the same unit of information.

6. The system of claim 5 wherein said arithmetic-logic means further includes:
a plurality of decoder means, each being coupled to the output terminals of a predetermined one of said processing network means, said control means being coupled to each of said decoder means and operative to enable one of said plurality of decoder means for receiving output signals from said predetermined one of said processing network means for receiving the results of one of said different operations performed upon said same unit of information.

7. The system of claim 6 further including:
collector channel means coupled to said first group of working register means; and,
a plurality of output gating means coupled to said collector channel means and to the output terminals of different ones of each of said processing network means, each of said output gating means being coupled to said control means and operative when enabled by said control means to apply signals present at said output terminals representative of the result of an operation performed by corresponding ones of said processing network means to said collector channel means for storage in selected ones of said first group of said working register means.

8. The system of claim 7 wherein said plurality of said processing network means includes:
a shift network coupled to said control means and being enabled by said control means to shift by predetermined amounts said units of information;
an arithmetic network coupled to said control means and being enabled by said control means to perform arithmetic operations upon said units; and,
a logic network coupled to said control means and being enabled by said control means to perform logical operations upon said units.

9. The system of claim 7 wherein said arithmetic-logic means further includes:
first gating means coupled said output terminals of said arithmetic network to a first one of said plurality of decoder means, said gating means being operatively coupled to said control means and when enabled by said control means to apply signals corresponding to the results of an operation performed upon said units to said first one of said decoder means for detecting predetermined bit patterns; and,
second gating means coupling said output terminals of said logic network to a second one of said plurality of said decoder means, said gating means being operatively coupled to said control means and when enabled by said control means to apply signals corresponding to the results of an operation performed upon said unit to said second one of said decoder means for detecting said predetermined bit patterns.

10. The system of claim 8 wherein said plurality of said processing network means further includes a compare network operatively coupled to said control means for comparing said units of data with a predetermined value stored in one of said second group of working register means.

11. A data processing system comprising:

storage means for storing information bytes representative of instructions and data pertinent to the execution of at least one program;

an addressable microprogrammed control store including a plurality of microprograms each having a plurality of microinstructions for executing said instructions and control means for generating subcommand control signals in response to said microinstructions read out from said control store;

processing means coupled to said storage means, said processing means including a plurality of independently operated functionally different network means, each having input and output terminals and being individually coupled to said control store for receiving said subcommand control signals;

a first group of addressable working registers for storing information bytes received from said storage means and being coupled to said control store;

a second group of addressable working registers for storing information bytes received from said storage means and being coupled to said control store;

a first distributor channel means coupled to said first group of addressable working registers for receiving bytes read out from addressed ones of said first group of registers;

a second distributor channel means coupled to said second group of addressable working registers for receiving bytes read out from addressed ones of said second group of registers; and, a plurality of gating means for selectively coupling said first and second distributor channel means to said inputs of said network means;

said control means being responsive during the execution of one of said instructions to microinstructions read out from said control store to generate subcommand control signals for enabling at least a pair of said gating means to apply the same unit of information from one of said distributor channel means to the input terminals of corresponding ones of said network means and each of said corresponding ones of said network means being enabled by certain ones of said subcommand control signals to perform a different operation upon said same unit of information.

12. The system of claim 11 wherein said processing means further includes:

a plurality of decoder means, each being coupled to the output terminals of a different predetermined one of said processing network means, said control means being coupled to each of said decoder means and operative to enable one of said plurality of decoder means for receiving output signals from said predetermined one of said network means for testing the results of one of said different operations performed upon said same unit of information.

13. The system of claim 12 further including:

collector channel means coupled to said first group of working register means; and, a plurality of output gating means coupled to said collector channel means and to the output terminals of different ones of each of said network means, each of said output gating means being coupled to said control means and operative when enabled by said control signals to apply signals representative of the result of an operation performed by corresponding ones of said network means to said collector channel means for storage in selected ones of said first group of said working registers.

14. The system of claim 13 wherein said plurality of said network means includes:

a shift network coupled to said control means, said shift network being operative in response to said subcommand control signals to shift by specified amounts said units of information;

an arithmetic network coupled to said control means, said arithmetic network being operative in response to said subcommand control signals to perform specified operations upon said units; and, a logic network coupled to said control means, said logic network being operative in response to said subcommand control signals to perform specified logical operations upon said units.

15. The system of claim 13 wherein said arithmetic-logic means further includes:

first gating means coupling said output terminals of said arithmetic network to a first one of said plurality of decoder means, said gating means being coupled to said control means and operative when enabled by said subcommand control signals to apply output signals to said first one of said decoder means for detecting predetermined bit patterns to test the result of an operation performed by said arithmetic network; and, second gating means coupling said output terminals of said logic network to a second one of said plurality of decoder means, said gating means being coupled to said control means and operative when enabled by said subcommand control signals to apply output signals to said second one of said decoder means for detecting predetermined bit patterns to test the results of an operation performed by said logic network.

16. The system of claim 14 wherein said plurality of said network means further includes a compare network coupled to said control means, said compare network in response to said subcommand control signals being operative to compare said units of data with a value stored in one of said working registers.

* * * * *

UNITED STATES PATENT OFFICE
CERTIFICATE OF CORRECTION

PATENT NO. : 3,969,702
DATED : July 13, 1976
INVENTOR(S) : Giancarlo Tessera

It is certified that error appears in the above-identified patent and that said Letters Patent are hereby corrected as shown below:

Please correct the name of the Assignee to read "Honeywell Information Systems Italia,Caluso, Italy" in lieu of --Honeywell Information Systems Inc., Waltham, Mass.--.

Signed and Sealed this fifth Day of July 1977

[SEAL]

Attest:

RUTH C. MASON
*Attesting Officer*

C. MARSHALL DANN
*Commissioner of Patents and Trademarks*